United States Patent [19]

Fujiwara et al.

[11] 4,032,598
[45] June 28, 1977

[54] PROCESS FOR PURIFYING HALOGENATED ALKENYLPHENOL POLYMERS

[75] Inventors: Hiroshi Fujiwara; Asao Takahashi, both of Soka; Ken Suzuki, Saitama, all of Japan

[73] Assignee: Maruzen Oil Co. Ltd., Osaka, Japan

[22] Filed: Apr. 26, 1976

[21] Appl. No.: 680,628

[52] U.S. Cl. .................. 260/878 R; 260/47 UA; 260/879; 260/880 R; 260/881; 260/884; 260/885; 260/886; 528/489; 528/490; 528/492

[51] Int. Cl.$^2$ .................. C08L 23/00; C08L 9/00; C08F 6/00; C08J 3/00

[58] Field of Search .................. 528/489, 490, 492; 260/47 UA, 878, 879, 880, 881, 884, 885, 886

[56] References Cited

UNITED STATES PATENTS

| | | | |
|---|---|---|---|
| 3,242,148 | 3/1966 | Kinchen et al. | 528/492 |
| 3,422,062 | 1/1969 | Segal et al. | 260/47 UA |
| 3,793,293 | 2/1974 | Ray-Chaudum et al. | 260/47 UA |

*Primary Examiner*—Joseph L. Schofer
*Assistant Examiner*—Herbert J. Lilling
*Attorney, Agent, or Firm*—Sughrue, Rothwell, Mion, Zinn & Macpeak

[57] ABSTRACT

A process for purifying a halogenated alkenylphenol polymer by treating the polymer with an aqueous solution of a basic compound such as a hydroxide, carbonate, or hydrogen carbonate of an alkali metal, an alkylamine, or ammonium. By the treatment, low molecular weight halides, etc., contained in the halogenated polymer as impurities are effectively removed.

19 Claims, 2 Drawing Figures

PROCESS FOR PURIFYING HALOGENATED ALKENYLPHENOL POLYMERS

BACKGROUND OF THE INVENTION

1. Field of the Invention

The present invention relates to a process for purifying a halogenated alkenylphenol polymer, more particularly, the invention relates to a process of producing a halogenated alkenylphenol polymer containing no impurities such as low molecular weight (i.e., less than about 400) halides, etc.

2. Description of the Prior Art

Compounds containing a halogen atom such as chlorine and bromine are important as flame retardants and various of such compounds are commercially available. However, halogen containing polymeric compounds known at present are few. Further, the properties of such halogen containing polymeric compounds can hardly be anticipated from those of conventional low molecular weight compounds. Accordingly, it can be expected that with the development of these halogen containing polymers new utilities other than flame retardants, and new fields, will be developed.

It is known that a polymer or copolymer of vinylphenol is an excellent reactive polymer, and processes for producing various derivatives thereof have been reported.

The inventors investigated preparing halogenated alkenylphenol polymers and the flame retardant effect of halogenated alkenylphenol polymers. In the production of such polymers, the separation and purification of the halogenated polymers which are the reaction products of the reaction are particularly important, and it is necessary to treat the polymers in a different manner than in the case of producing low molecular weight halogen compounds. That is, in this case it is necessary to completely remove reaction medium, unreacted halogen, hydrogen halide, etc., from the reaction product, and the removal of these impurities is insufficient by a mere simple washing and drying. The inventors confirmed that when these low molecular compounds remain in the polymer they accelerate the gelation of the polymer, and, in particular, they cause discoloring and the generation of an irritative odor at high temperature, which greatly reduces the usefulness of the polymer.

For example, when a halogenated alkenylphenol polymer is blended with an epoxy resin, a hardened resin is formed, but if the aforesaid low molecular weight materials remain in the halogenated alkenylphenol polymer, the hardening reaction is abnormally accelerated, which makes it impossible to obtain a blend having uniform quality. Furthermore, it is known that a blend of a halogenated alkenylphenol polymer and an epoxy resin has excellent heat resistance, but when these low molecular weight materials remain in the blend, the heat resistance of the blend is greatly reduced by the generation of gases and at the same time the blend discolors.

The inventors further found that in a halogenated alkenylphenol polymer unstable halogen bonded to the polymer exists in an amount of 0.1–3% by weight of the total amount of the polymer. The unstable halogen bond is assumed to be a substitution bond at the tertiary carbon atom of the polymer chain. This was indirectly confirmed by experiments involving treating o-bromophenol or p-xylylene dichloride, which is the low molecular weight model compound of the halogen compound. Also, it was confirmed that an α-halogen substituted product was partially formed in the halide of p-ethylphenol, which is the low molecular weight model compound of poly-p-vinylphenol. Therefore, it is clear that there is a partial halogen substitution in the polymer main chain of a vinylphenol polymer.

Since the tertiary carbon substituted halogen bond has a bond dissociation energy lower than an aromatic substituted halogen bond by about 20 Kcal/mole, the tertiary carbon substituted halogen bond is liable to be decomposed and a polymer containing such a tertiary carbon substituted halogen shows somewhat lower heat resistance. Thus, if such a polymer is used as a heat resistance resin, it is subject to defects such as discoloring, a reduction in bending strength, etc., upon heating.

SUMMARY OF THE INVENTION

One object of this invention is, therefore, to provide an improved process of purifying halogenated alkenylphenol polymers.

Another object of this invention is to provide a process of completely removing reaction medium, by-produced hydrogen halide, unreacted halogenating agent, etc., contained in a halogenated alkenylphenol polymer, and unstable halogen bonded to the polymer.

A further object of this invention is to provide a material for producing resins having high heat resistance.

It has now been discovered that the aforementioned objects of this invention can be attained by the following process of this invention. That is, according to the present invention, there is provided a process of purifying a halogenated alkenylphenol polymer which comprises treating a halogenated alkenylphenol polymer with an aqueous solution of at least one basic compound selected from the group consisting of an alkali metal hydroxide, an alkali metal carbonate, an alkali metal hydrogen carbonate, an alkylamine, and ammonia.

BRIEF DESCRIPTION OF THE ACCOMPANYING DRAWING

The figures of the accompanying drawings are graphs showing test results on the heat resistance of a laminate prepared from a varnish which is produced using a polymer purified by the process of this invention and a laminate prepared from a varnish produced using a polymer not purified by the process of this invention, in which.

DETAILED DESCRIPTION OF THE INVENTION

Figure 1:
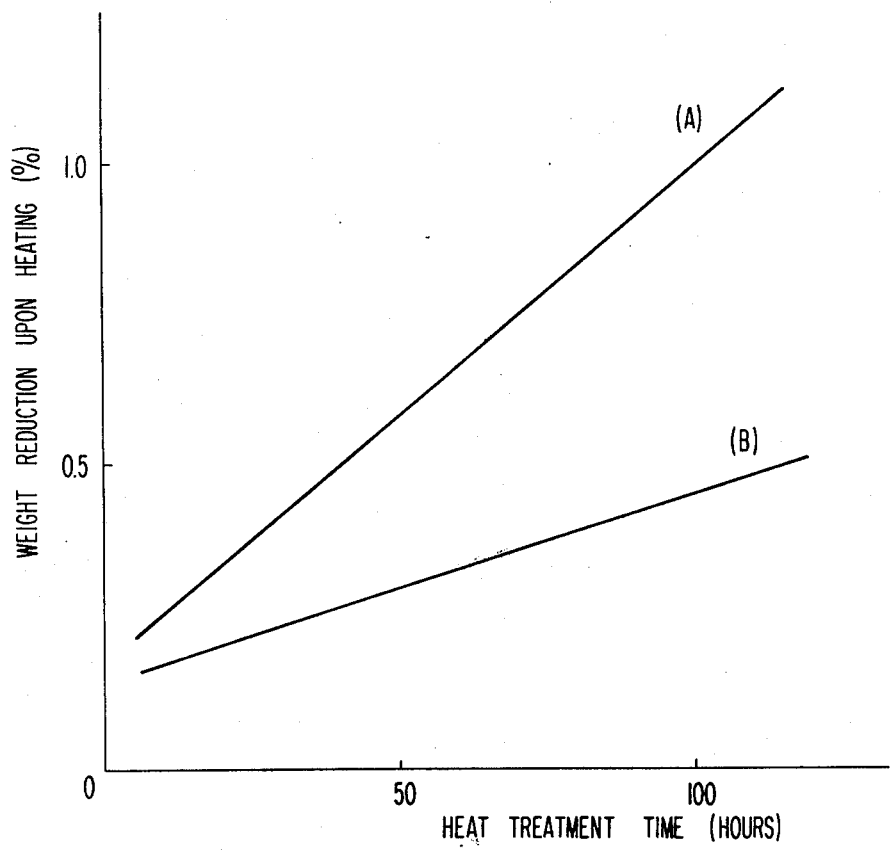
FIG. 1 is a graph showing the weight change of the laminates upon heating.

The halogenated alkenylphenol polymer treated according to the process of this invention is a polymer having the structural unit represented by general formula (I)

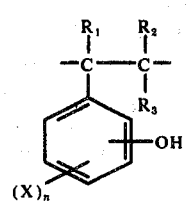

(I)

wherein $R_1$, $R_2$, and $R_3$ each represents a hydrogen atom or an alkyl group of 1 to 3 carbon atoms, X represents a halogen atom, and $n$ represents 0 or an integer of 1 to 3. However, the mean value of $n$ in the polymer is generally about 0.1 to about 3, more particularly 0.1 to 2.

The hydroxyl group (OH) of the aforesaid structural unit may be positioned at any of the o-, m-, or p-positions, and X is in at least one of the o-position and the p-position to the hydroxyl group, and may be in both the o-position and the p-position, or, although this case is very rare, at the o-, p-, and m-positions. Examples of the halogen atom shown by X are chlorine, bromine, and iodine.

The halogenated alkenylphenol polymer treated in the process of this invention can be a homopolymer containing only the structural unit of general formula (I), or may be a copolymer composed of the above structural unit and a vinyl monomer, or further may be a graft-copolymer of the halogenated alkenylphenol copolymer.

The aforementioned halogenated alkenylphenol polymer can be easily prepared by conventional techniques. Generally, the polymer is prepared by polymerizing an alkenylphenol monomer and then halogenating the polymer thus prepared, but it may be also be prepared by polymerizing a halogenated alkenylphenol.

The former method will be briefly explained.

An alkenylphenol monomer is dissolved in a solvent at a concentration of about 10 to about 50% by weight of the monomer, and, after adding to the solution a polymerization initiator in an amount of about 0.001 to about 1% by weight of the monomer, the polymerization is carried out for about 1 to about 10 hours at about 60° to about 80° C under atmospheric pressure or sub- or super-atmospheric pressure. The reaction product is then gradually dissolved in water to deposit the polymer formed, which is recovered by filtration and heated for 1 hour at 100° C to provide the powdery polymer product.

Examples of the solvent used in the polymerization are tetrahydrofuran, dioxane, acetone, methanol, methylene chloride, nitrobenzene, etc.

Examples of the polymerization initiator used in the reaction are azobisdiisobutyronitrile, benzoyl peroxide, t-butyl hydroperoxide, potassium peroxide, boron trifluoride, boron trifluoride ethyl etherate, aluminum chloride, stannic chloride, titanium tetrachloride, n-butyl lithium, etc.

Copolymers of an alkenylphenol monomer can be obtained is substantially the same fashion as above, and useful methods are described in detail in, for example, M. Kato, J. Polymer Sci. A-1, 7(8) 2175 (1969).

The halogenation reaction of the polymer formed may be carried out using the reaction mixture containing the polymer obtained by the aforementioned production of the polymer without isolating the polymer from the reaction mixture or may be carried out using a solution or a suspension of the polymer prepared by once depositing the polymer formed as described above and dissolving or suspending the polymer in a proper solvent.

Thus, to the solution or suspension containing about 5 to about 50% by weight of the alkenylphenol polymer there is gradually added a halogenating agent in an amount of about 0.1 to about 4 mole equivalents per phenol nucleus of the polymer at a temperature of about 0° to about 70° C and then the mixture is stirred. The total reaction time is about 1 to about 10 hours. The halogenated polymer thus obtained is filtered, washed with an excess of the aforesaid solvent or water and then dried by air.

Examples of the solvent for dissolving the alkenylphenol polymer in the halogenation reaction are alcohols such as methanol, ethanol, propanol, etc.; acetic acid, ethyl acetate, butyl acetate, dioxane, tetrahydrofuran, diethyl ether, dimethylformamide, dimethylsulfoxide, etc.

Examples of the medium for suspending the alkenylphenol polymer are carbon tetrachloride, chloroform, methylene chloride, hexane, heptane, octane, benzene, toluene, xylene, water, etc. The halogenation of copolymers and graft-copolymers can be carried out in the same manner as described above.

Furthermore, examples of the halogenating agent used in the reaction are chlorine, bromine, iodine, iodine chloride, iodine bromide, bromine chloride, thionyl bromide ($SOBr_2$), N-bromosuccinimide, dioxane bromide, N-chloroamide, sulfuryl chloride ($SO_2Cl$), etc, where iodine chloride and iodine bromide act as an iodinating agent and bromine chloride acts as a brominating agent.

The vinyl monomer usually used in the copolymer is the monomer represented by general formula (II)

(II)

wherein $R_4$ and $R_5$ each represents a hydrogen atom or an alkyl group of 1 to 4 carbon atoms; $R_6$ represents a hydrogen atom or an alkyl group of 1 to 4 carbon atoms; and $R_7$ represents a phenyl group, an alkyl- or halogenated alkyl-phenyl group such as phenyl group having an alkyl group of 1 to 8 carbon atoms and a halogenated alkyl group of 1 to 4 carbon atoms, (the halogen being, e.g., chlorine, bromine iodine, etc.) —$OR_8$ (wherein $R_8$ is an alkyl group of 1 to 8 carbon atoms), —$COR_9$ (wherein $R_9$ is an alkyl group of 1 to 8 carbon atoms), —CHO, —CN, —$COOR_{10}$ (wherein $R_{10}$ is a hydrogen atom or an alkyl group of 1 to 8 carbon atoms), or

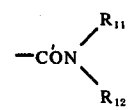

(wherein $R_{11}$ and $R_{12}$ each is a hydrogen atom or an alkyl group of 1 to 8 carbon atoms). The alkyl groups of the above formulae may be straight or branched chain.

Practical examples of such vinyl compounds are styrene, α-methylstyrene, 2-, 3- or 4-chloromethylstyrene, methyl vinyl ether, ethyl vinyl ether, propyl vinyl ether, butyl vinyl ether, acrylonitrile, acrolein, acrylic acid, methacrylic acid, methyl esters of these acids, ethyl esters of the acids, propyl esters of the acids, butyl esters of the acids, 2-ethylhexyl esters of the acids, and acrylamide. Additionally, maleic anhydride can be used.

A graft-copolymer of the halogenated alkenylphenol copolymer is generally prepared in the following manner. That is, an alkenylphenol monomer having a structure as represented by general formula (I) wherein $n$ is O is grafted onto an aliphatic hydrocarbon polymer such as polyethylene, polypropylene, polybutene, polybutadiene and the like, an aromatic hydrocarbon polymer such as polystyrene, poly-$\alpha$-methylstyrene and the like, a halogenated vinyl polymer such as polyvinyl chloride, polyvinylidene chloride, polytetrafluoroethylene and the like, or a main chain polymer such as polyacrylonitrile, polyacrylic acid, polymethacrylic acid and the like followed by halogenating the resulting graft-polymer, or a halogenated alkenylphenol monomer having a structure as represented by general formula (I) wherein $n$ is not O is grafted onto the main chain of the above-described compounds. The graft-reaction is carried out using ionizing radiation, for example, $\gamma$-rays, X-rays, electron beams and $\alpha$-rays, or an initiator such as, for example, $Ce^{4+}$, nickel carbonyl, benzoyl peroxide and the like. The radiation doses are generally about $10^3$ to about $10^{11}$ rad/hr. The weight ratio (grafting ratio) of monomer to polymer (main chain) after the graft-reaction is generally about 1/100 to about 500/100, preferably about 5/100 to about 300/100. Moreover, the above described monomers are generally used as a monomer solution in which the monomers are dissolved in a solvent such as a ketone (e.g., acetone, methyl ethyl ketone, etc.), an ester (e.g., ethyl acetate, butyl acetate, etc.), an alcohol (e.g., methanol, ethanol, etc.), or an aromatic hydrocarbon (e.g., benzene, toluene, etc.).

A weight average molecular weight of these halogenated polymers, copolymers and the like is generally about 800 to about 2,000,000, preferably about 1,000 to about 1,000,000.

Any of the aforementiond halogenated alkenylphenol copolymers containing the impurities (in general, the content of these impurities in the crude halogenated alkenylphenol polymers is less than about 5% by weight, generally less than about 3% by weight) as described above can be used as the polymer treated by the process of this invention regardless of the manner of production and the ratio of the halogenated alkenylphenol, but, in general, a copolymer having about 1 to about 100% by weight, preferably 10 to 100% by weight halogenated alkenylphenol is advantageously used in this invention.

Further, the polymer used in this invention may be one or more homopolymers or copolymers or further a mixture thereof and the proportion of the halogenated alkenylphenol in the homopolymers or copolymers may be the same as described above.

Preferred examples of copolymers are a (p, m, o-) vinylphenol-styrene copolymer, a (p,m,o-) vinylphenol-methylstyrene copolymer, a (p,m,o-) isopropenylphenol-styrene copolymer, a (p, m,o-) vinylphenol-acrylic acid copolymer, a (p,m,o-) vinylphenol-methacrylic acid copolymer, a (p,m,o-) vinylphenol-methyl methacrylate copolymer, a (p,m,o-) vinylphenol-acrylic amide copolymer, a (p,m,o-) vinylphenolmaleic acid anhydride copolymer and the like.

Some of the basic compounds used in this invention for treating the halogenated alkenylphenol compound are alkali metal compounds as described before and examples of the alkali metal include sodium, potassium, cesium, and rubidium.

Furthermore, an alkylamine can also be used in this invention for treating the halogenated alkenylphenol polymer and the alkylamine shown by the following general formula may be generally used for the purpose:

wherein $R_{13}$, $R_{14}$, and $R_{15}$ each represents a hydrogen atom or a straight chain or branched chain alkyl group of 1 to 4 carbon atoms, at least one of $R_{13}$, $R_{14}$ and $R_{15}$ being an alkyl group.

The alkylamine used in this invention may be a mono-, di-, or trialkylamine and examples of the alkylamine are monoethylamine, monopropylamine, monobutylamine, dimethylamine, diethylamine, dipropylamine, dibutylamine, trimethylamine, triethylamine, tributylamine, etc.

Particularly excellent basic compounds used in this invention are alkali metal hydroxides, alkali metal carbonates, and ammonia.

In the process of this invention the polymer is usually subjected to purification after it is dissolved in the treatment solution. After dissolving the polymer, it is preferred to remove insoluble matter from the solution of the polymer by settlement, filtration or centrifugal separation usually at atmospheric pressure, or optionally at sub- or super-atmospheric pressure.

The concentration of the aqueous solution of the basic compound is generally about 1 to about 50% by weight, preferably 5 to 20% by weight, based on the treatment solution weight.

The amount of the basic compound used in the process of this invention is about 1/100 to about 20 equivalents, preferably 0.8 to 2.0 equivalents based on each phenol nucleus in the polymer. If the amount of the basic compound is less than 1/100 equivalent, the polymer cannot be sufficiently purified, while, on the other hand, although more than 20 equivalents of the basic compound may be used, the use of such a large amount of the basic compound is disadvantageous and further is undesirable from the viewpoint of purification since a large amount of acid is required in the case of separating the polymer from the basic compound.

Thus, the amount of the aqueous solution of the basic compound used in the process of this invention is generally about 1 to about 3,000 parts by weight, preferably 10 to 1,000 parts by weight, per 100 parts by weight of the polymer.

The treatment temperature is generally about 0° to about 200° C. If the temperature is lower than about 0° C, the rate of reaction occurring at purification is quite low, which is undesirable in the practice of this invention. The temperature of the treatment is practically higher than 50° C, but if the temperature is higher than 100° C, the treatment solution boils, which requires a pressure vessel.

The treatment is generally carried out about for 1 to about 5 hours, but usually sufficient results are obtained by a treatment for about 1 hour. The treatment may be practiced without stirring, etc. The treatment is carried out under a pressure such that the treatment solution does not boil, and, hence, in the case of treating at temperatures lower than 100° C, it may be practiced at normal pressure.

After the treatment is completed, the polymer is recovered from the solution, preferably by neutralization with acids. That is, an excess of an inorganic acid such as hydrochloric acid, nitric acid, sulfuric acid, etc., is added to the solution of the polymer to liberate the polymer and then the polymer is separated from the solution by filtration or centrifugal separation. The acid is generally used as an aqueous solution thereof of about 0.1 to about 90% by weight, preferably 1 to 15% by weight, acid. The amount of the aqueous solution of the acid is generally about 1/100 to about 100 parts by volume, preferably 1/10-10 parts by volume, per volume of the solution containing the polymer.

Furthermore, the polymer may be separated from the solution by distilling off water or water and alkylamine.

The polymer thus separated is repeatedly washed with water. In the case of removing inorganic acid remaining in the polymer thus separated, the polymer is dissolved in a low boiling point solvent which is readily soluble in water, such as monohydric alcohols having 1 to 3 carbon atoms and/or ketones having 3 to 4 carbon atoms, with methanol and/or acetone being preferred, the solution is added to a very large amount of water, and then the polymer thus deposited is recovered and further washed with water followed by drying.

According to the process of this invention, the purification of the halogenated alkenylphenol polymer formed can be almost completely performed in one purification step, and, thus, a high purity polymer can be obtained with high efficiency. Furthermore, by the process of this invention, unstable halogens bonded as substituents to the tertiary carbon of the polymer are released as hydrogen halide or replaced by a hydroxy group, and the polymer thus treated has the merits that the polymer has an improved heat resistance and does not release hydrogen halide upon heating. Moreover, with a polymer treated by the process of this invention, the halogens bonded to the aromatic nucleus are very stable.

The halogenated alkenylphenol polymer or copolymer thus treated by the process of this invention is a substantially colorless or orangish odorless powder, is stable even under heating in air at 120° C, and can provide a hardened resin possessing excellent heat resistance and flame retardance by reaction with an epoxy resin such as a bisphenol type epoxy resin, a cyclohexyl type epoxy resin, etc., in the presence of a curing agent such as p-dimethylaminobenzaldehyde, etc., at about 170° C for about 2 hours.

The thus obtained pure halogenated alkenylphenol polymer can be easily dissolved in a solvent, such as, for example, alcohols such as methanol, ethanol, isopropanol, butyl alcohol, octyl alcohol, benzyl alcohol, diacetone alcohol, allyl alcohol, methyl cellosolve, ethyl cellosolve, butyl cellosolve, etc.; ketones such as acetone, methyl ethyl ketone, methyl isobutyl ketone, etc.; esters such as methyl acetate, butyl acetate, amyl acetate, etc.; acids such as acetic acid, acetic anhydride, etc.; phenols such as phenol, cresol, etc.; ethers such as ethyl ether, dioxane, tetrahydrofuran, etc.; halogenated hydrocarbons such as chloroform, dichloroethane, etc.; dimethylformamide; N-ethyl-2-pyrrolidone; etc.

The invention will be further illustrated more practically by the following examples, in which all percentages are by weight unless otherwise indicated. However, it will be understood that these examples are only intended to illustrate the invention, not to limit it.

In following Synthesis Example and Examples 1 to 7, all processes were carried out at atmospheric pressure.

SYNTHESIS EXAMPLE

Preparation of Poly-p-vinylphenol 10 g of p-vinylstyrene was dissolved in 90 g of tetrahydrofuran and then, after adding to the solution 0.1 g of azobisisobutyronitrile, the mixture was maintained at 50° C for 3 hours. The reaction product obtained was gradually poured into 2 liters of water to deposit a polymer. The polymer was recovered by filtration and heated at 100° C for 1 hour, whereby the polymer was obtained as a powder. The intrinsic viscosity of the polymer measured in tetrahydrofuran at 30° C was 0.10.

EXAMPLE 1

The poly-p-vinylphenol powder prepared in the above Synthesis Example was suspended in four times its weight of carbon tetrachloride with stirring in a four-necked flask equipped with a stirrer, a thermometer, a reflux condenser, and a dropping funnel, and bromine in an amount of two molar equivalents to the phenol nucleus of the polymer was added drop-wise to the suspension through the dropping funnel followed by maintaining the reaction temperature at not over 50° C. Thereafter, the mixture was further stirred and the reaction was finished after a total reaction period of 5 hours. The obtained brominated polymer was recovered by filtration, washed with an excess of carbon tetrachloride and dried, whereby an almost colorless polymer powder was obtained. The total content of bromine in the polymer was 52.2% (the mean value of $n$ in the polymer being 1.64) of the total weight of the polymer.

Also, the chlorine content due to the use of the reaction solvent (carbon tetrachloride) was 1.9% by weight. The polymer prepared was dissolved in tetrahydrofuran and the solution subjected to gas chromatography using p-t-butylphenol as an internal standard to quantitatively analyze for $CCl_4$. The results showed that the content of carbon tetrachloride was 2.0% by weight, which amount coincided with the proportion of chlorine in the polymer determined by elemental analysis of the polymer.

Further, 0.3 g of the polymer thus obtained was dissolved in methanol, and, after adding to the solution an aqueous solution of 10% potassium iodide, the mixture was stirred well. The system was then allowed to stand, and, after adding thereto starch as an indicator, the bromine content was determined using sodium thiosulfate. The results showed that the unreacted bromine content was 1.0% by weight.

0.3 g of the polymer was also dissolved in methanol, and, after acidifying the solution with nitric acid, an excess of aqueous nitric acid and an indicator, ferric ammonium sulfate, were added to the solution and then a back titration carried out with ammonium thiocyanate. The free iodine ion content thus measured was 2.4%.

A sample of the polymer was then dissolved in an aqueous solution containing 10% sodium hydroxide (NaOH/polymer = 0.3 weight ratio) and the solution allowed to stand for 1 hour at 50° C. Then, after cooling the reaction mixture to room temperature (25° C), an aqueous solution of 5% hydrochloric acid in an amount of 10 parts by weight per one part by weight of the polymer was added to the solution to liberate the polymer. The polymer was then washed repeatedly with water, recovered by filtration, and then further washed with water. The polymer product thus obtained was dried at 120° C until the weight of the product became constant. The results of elemental analysis of the product showed that the total bromine content was 49.2%; free bromine ion was not observed by a silver nitrate titration.

Furthermore, when a part of the polymer thus treated was treated again with an aqueous solution of 10% sodium hydroxide as in the above procedure, the total bromine content of the polymer was the same as that of the polymer before the second treatment, that is, 49.2%.

Since there was no way to quantitatively determine the amount of unstable halogen in the polymer, the inventors attempted to treat the polymer by the process of this invention until the amount of halogen bonded to the polymer did not change and defined the difference between the amount of bonded halogen after the treatment and the amount of bonded halogen before the treatment as the amount of unstable halogen. This definition was confirmed to be correct by various experimental results.

According to the aforesaid definition, it was confirmed that unstable bromine was completely removed by one treatment of the process of this invention in the aforementioned experiment.

The aforesaid solution for treatment was acidified with nitric acid and the free bromine ion content quantitatively analyzed by a nitric acid titration; bromine ion was not detected. From this fact, it is clear that unstable bromine in the polymer was completely removed therefrom by the treatment of this invention.

Furthermore, unreacted bromine and the reaction solvent ($CCl_4$) were not detected in the polymer.

The polymer thus treated was then mixed with an equimolar amount of an epoxy resin of the bisphenol type, DER-331 (trademark made by Dow Chemical Co., epoxy equivalent 180-200) and the mixture heated to 140° to 150° C to form a uniform solution. Then, 1 phr (per one hundred weight of resin) of p-dimethylaminobenzaldehyde was added to the solution as a catalyst for a hardening reaction and the mixture poured into a glass mold followed by heating to 170° C for 2 hours to harden the mixture, whereby a homogeneous transparent hardened product was prepared. The heat deformation temperature of the product was 152° C.

EXAMPLE 2

A brominated polymer (air dried product) obtained in the same way as in Example 1 was dissolved in an aqueous solution of 10% potassium carbonate ($K_2CO_3$/polymer = 0.4 by weight ratio) and the solution heated for 1 hour at 100° C. Then, the solution was cooled to room temperature, an aqueous solution of 3% sulfuric acid in an amount of 10 times by weight the weight of the polymer was added to the solution to liberate the polymer, and the polymer was recovered, washed repeatedly with water, filtered, washed with water, and dried at 120° C until the weight of the polymer became constant. The total bromine content by elemental analysis was 49.1% by weight, and free bromine ion was not detected by a silver nitrate titration. Further, unreacted bromine, the reaction medium ($CCl_4$), and unstable bonded bromine were not detected in the polymer.

EXAMPLE 3

A styrene-p-vinylphenol copolymer (1 : 1 molar ratio, intrinsic viscosity: 0.21) was suspended in carbon tetrachloride in an amount of 3 times by weight the weight of the copolymer and then chlorine gas was blown into the suspension with stirring. After blowing chlorine in an amount of 2 molar equivalents for each phenol nucleus, the system was stirred at about 40° C for 5 hours, whereby the reaction was finished. The product was filtered, washed, and dried in air. The total amount of chlorine in the polymer thus obtained was 19.3%. The amounts of carbon tetrachloride and unreacted chlorine by gas chromatography were 2.0% and 2.5%, respectively. Also the proportion of free chlorine ion was 2.3%.

The polymer was then added to an aqueous solution of 10% diethylamine (diethylamine/polymer ratio = 0.2 by weight) to form an uniform solution, which was heated at 100° C for 2 hours. The reaction mixture was then cooled to room temperature, and, after adding thereto an aqueous solution of 4% hydrochloric acid in an amount of 20 times by weight the weight of the polymer, the polymer thus liberated was washed with water, dissolved in acetone in an amount of 2 times by weight that of the polymer, and the resulting solution poured into a large amount of water to deposit the polymer. As a result of elemental analysis, the total chlorine content was confirmed to be 16.0%. Furthermore, free chlorine ion was not detected. Also, unreacted chlorine and carbon tetrachloride were not detected in the polymer. Still further, the amount of unreacted bonded chlorine determined after treating 0.3 g of the polymer with an aqueous solution of 10% sodium hydroxide was 0.5%.

EXAMPLE 4

Poly-(p-isopropenylphenol) having a molecular weight of about 5,000 was suspended in carbon tetrachloride in an amount of 4 times by weight the weight of the polymer as in Example 1. After adding drop-wise to the suspension bromine in an amount of 2 moles times to the phenol nucleus in the polymer through a dropping funnel, the mixture was maintained at a temperature not over 50° C and, thereafter, the system was further stirred at the same conditions. The total period of reaction was 5 hours. The reaction product was filtered, washed, and air dried to provide a polymer. The total bromine content of the polymer was 48.3%. Also, the proportions of free bromine, unreacted bromine, and carbon tetrachloride (by gas chromatography) were 2.3%, 2.1%, and 1.9%, respectively.

The polymer was then dissolved in an aqueous solution of 10% sodium hydroxide in an amount of 4 times by weight the weight of the polymer and the solution allowed to stand for 1 hour at 50° C. Then, an aqueous solution of 5% hydrochloric acid in an amount of 10 times by weight the weight of the polymer was added to the solution to deposit the polymer, which was recovered by filtration, washed with water, and air dried. The total bromine content of the polymer thus obtained was 45.9%. Free bromine ion in the polymer was not detected by a nitric acid titration. Furthermore, carbon tetrachloride was not detected.

EXAMPLE 5

A m-vinylphenol-acrylic acid copolymer (1 : 1 molar ratio, intrinsic viscosity: 0.23) was dissolved in methanol in an amount of 10 times by weight the weight of the polymer as in Example 1 and then chlorine gas in an amount of 2 mole equivalents per phenol nucleus was blown into the solution with stirring at about 40° C for 1 hour. Thereafter, the system was further stirred at about 40° C for 5 hours to complete the reaction. The reaction product was then recovered by filtration, washed, and air dried to provide the polymer. The total chlorine content in the polymer was 18.0%. Also, free chlorine ion, unreacted chlorine, and methanol in the polymer were 3.2%, 2.5%, and 1.9%, respectively. The polymer was then uniformly dissolved in an aqueous potassium hydroxide solution in an amount of the 3 molar times the sum of the carboxylic acid groups and phenol groups in the copolymer and the solution allowed to stand for 1 hour at 50° C. The reaction product was then added to 5% by weight aqueous solution of hydrochloric acid in an amount of 15 times by weight the weight of the polymer and the polymer thus deposited was collected, washed with water, and dried. The results of elemental analysis of the polymer showed that the total chlorine content was 14.5%. Also, free chlorine ion, unreacted chlorine, unstable bonded chlorine and methanol were not detected in the polymer.

EXAMPLE 6

In this example, the heat resistance of a polymer purified by the process of this invention was measured.

A. The brominated polyvinylphenol (containing 2.4% free bromine ion) prepared by the process of Example 1 was washed with a large amount of water until no free chlorine ion was detected. The polymer thus treated was used in the following procedure.

B. The brominated polyvinylphenol subjected to the sodium hydroxide treatment according to the process of Example 1 was used.

Preparation of test sample

Into 180 parts by weight of acetone were uniformly dissolved 100 parts by weight of the aforesaid epoxy resin, DER-331 (trademark, made by Dow Chemical Co.), 34 parts by weight of poly-p-vinylphenol having a molecular weight of about 6,000, and 66 parts by weight of the brominated poly-p-vinylphenol and then 2 phr of p-dimethylaminobenzaldehyde was added to the solution to provide a varnish.

A glass cloth having a thickness of about 0.18 mm was impregnated with the varnish (varnish content: about 42% by weight) an air dried followed by heat drying at 145° C for 5 minutes to provide a prepreg. Then, 18 sheets of the prepregs thus prepared were laminated, set under pressing, and heated at 175° C for 2 hours under a pressure of 40 kg/cm$^2$ to provide a laminate 3 mm thick. Test samples each having a width of 2.5 cm and a length of 8 cm were cut from the laminate.

Heat treatment of the test samples

The test samples thus prepared were placed in an air bath at 200° C and each of the test samples was withdrawn therefrom every 10 hours, and then the change in weight and the bending strength (at 150° C) were measured. The results are shown in the accompanying figures. Sample (A) is represented by curve (A) and sample (B) by curve (B) in FIGS. 1 and 2, respectively.

The bending strength was determined by the method of JIS (Japanese Industrial Standard) K-6911, that is, a sample of the laminate having a thickness of about 3 mm, a width of about 2.5 mm and a length of about 80 mm was held horizontally at two fulcrums in a distance of 50.8 mm. At the center of the fulcrums a load was applied vertically to bend the sample downward. The bending was increased as the load was increased, and, finally, the sample was broken. The bending strength was calculated by the following equation, wherein P represents the breaking load.

$$\text{Bending Strength [kg/mm}^2\text{]} = \frac{3 \times P[\text{kg}] \times 50.8 \text{ [mm]}}{2 \times \text{width of sample (mm)} \times [\text{thickness of the sample (mm)}]^2}$$

Figure 2:
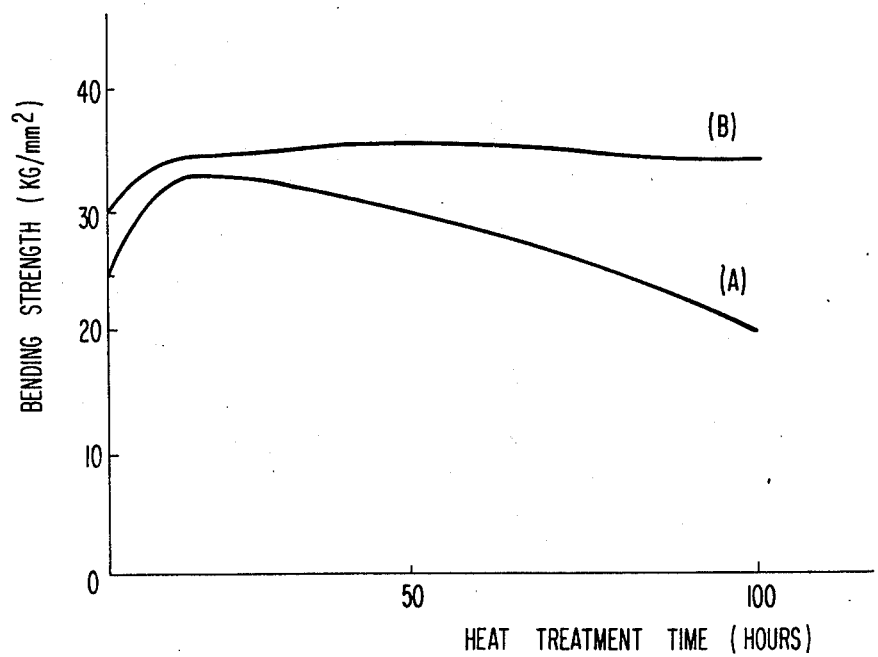
FIG. 2 is a graph showing the change in the bending strength of the laminates upon heating.

From the results shown in FIG. 1 and FIG. 2, it will be understood that the laminate prepared using the brominated vinylphenol purified by the process of this invention showed less weight change and a lesser reduction in bending strength upon heating and had excellent heat resistance.

EXAMPLE 7

The brominated poly-p-vinylphenol (containing 52.5% by weight bromine) prepared in the same manner as in Example 1 was purified using an aqueous solution of 10% by weight of the basic compound shown in the following table in an amount of 10 times by weight the weight of the polymer under the conditions shown in the same table.

Also, the amount of bromine remaining in the purified polymer measured by the same silver nitrate titration as described in Example 2 is also shown in the table.

Table

| | Temperature (° C) | Time (hr.) | Amount of unstable bromine (wt.%)* |
|---|---|---|---|
| 1. NaOH | 50 | 1 | 0 |
| 2. KOH | 50 | 1 | 0 |
| 3. K$_2$CO$_3$ | 100 | 1 | 0 |
| 4. NaHCO$_3$ | 100 | 2 | 0.5 |
| 5. Triethylamine | 100 | 2 | 0.5 |
| 6. Diethylamine | 100 | 2 | 0.6 |
| 7. Ammonia | 50 | 1 | 0 |

*The ratio of bromine remaining in the polymer to unstable bromine in the polymer.

While the invention has been described in detail and with reference to specific embodiments thereof, it will be apparent to one skilled in the art that various changes and modifications can be made therein without departing from the spirit and scope thereof.

What is claimed is:

1. A process of purifying a halogenated alkenylphenol polymer which comprises treating the halogenated alkenylphenol polymer with an aqueous solution of at least one basic compound selected from the group consisting of an alkali metal hydroxide, an alkali metal carbonate, an alkali metal hydrogen carbonate, an alkylamine and ammonia, wherein the amount of said basic compound is about 1/100 to about 20 equivalents per phenol nucleus in the polymer, such process being carried out at a temperature no lower than about 0° C.

for about 1 to about 5 hours to thereby dissolve the polymer in the aqueous solution of the basic compound.

2. The process of claim 1 wherein said halogenated alkenylphenol polymer is a polymer comprising the structural unit shown by the general formula:

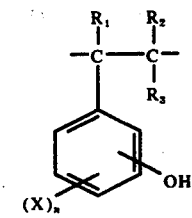

wherein $R_1$, $R_2$, and $R_3$ each represents a hydrogen atom or an alkyl group of 1 to 3 carbon atoms; X represents a halogen atom; and $n$ represents O or an integer of 1 to 3.

3. The process of claim 2 wherein the mean value of $n$ in the polymer is about 0.1 to about 3.

4. The process of claim 3 wherein said halogenated alkenylphenol polymer is the polymer comprising the following structural unit:

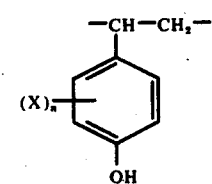

wherein the mean value of $n$ in the polymer is about 0.1 to about 3.

5. The process of claim 2 wherein said halogenated alkenylphenol polymer is a polymer comprising the following structural unit:

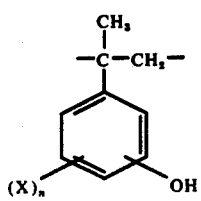

wherein the mean value of $n$ in the polymer is about 0.1 to about 3.

6. The process of claim 2 wherein said halogenated alkenylphenol polymer is a copolymer comprising the structural unit shown by the formula in claim 2 and a vinyl compound wherein the mean value of $n$ in the polymer is about 0.1 to about 3.

7. The process of claim 6 wherein said vinyl compound is the compound represented by the general formula

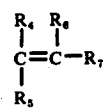

wherein $R_4$ and $R_5$ each represents a hydrogen atom or an alkyl group of 1 to 4 carbon atoms; $R_6$ represents a hydrogen atom or an alkyl group of 1 to 4 carbon atoms; and $R_7$ represents a phenyl group, a phenyl group substituted by an alkyl group of 1 to 8 carbon atoms or a halogenated alkyl group of 1 to 4 carbon atoms in which the halogen is chlorine, bromine or iodine, $-OR_8$ wherein $R_8$ is an alkyl group of 1 to 8 carbon atoms, $-COR_9$ wherein $R_9$ is an alkyl group of 1 to 8 carbon atoms, $-CHO$, $-CN$, $-COOR_{10}$ wherein $R_{10}$ is a hydrogen atom or an alkyl group of 1 to 8 carbon atoms, or

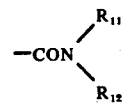

where $R_{11}$ and $R_{12}$ each represents a hydrogen atom or an alkyl group of 1 to 8 carbon atoms, wherein the alkyl group may be straight or branched chain.

8. The process of claim 6 wherein said halogenated alkenylphenol copolymer is a copolymer comprising the following structural unit

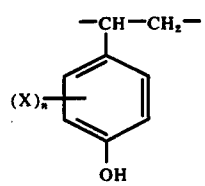

wherein the mean value of $n$ in the polymer is about 0.1 to about 3, and styrene.

9. The process of claim 6 wherein said halogenated alkenylphenol copolymer is a copolymer comprising the following structural unit

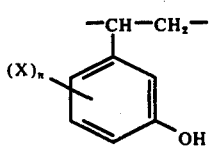

wherein the mean value of $n$ in the polymer is about 0.1 to about 3, and acrylic acid.

10. The process of claim 1, wherein said halogenated alkenylphenol polymer is a graft-copolymer of a halogenated alkenylphenol polymer.

11. The process of claim 1 wherein said alkali metal is sodium or potassium.

12. The process of claim 1 wherein said alkylamine is a compound shown by the following general formula

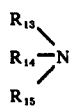

wherein $R_{13}$, $R_{14}$ and $R_{15}$ each represents a hydrogen atom or an alkyl group having 1 to 4 carbon atoms, at least one of $R_{13}$, $R_{14}$ and $R_{15}$ being an alkyl group.

13. The process of claim 12 wherein said alkylamine is diethylamine or triethylamine.

14. The process of claim 1 wherein the concentration of the aqueous solution of the basic compound is about 1 to about 50% by weight.

15. The process of claim 1 wherein said purification treatment is carried out at about 0° to about 200° C by dissolving the polymer to be treated in the aqueous solution of the basic compound.

16. The process of claim 1 wherein after said purification treatment, the resulting polymer solution is neutralized by an acid to thereby separate the pure polymer.

17. The process of claim 16 wherein the acid is an inorganic acid.

18. The process of claim 17 wherein said inorganic acid is hydrochloric acid, nitric acid or sulfuric acid.

19. The process of claim 1 wherein after said purification treatment, an insoluble matter is removed from the resulting polymer solution and then the resulting solution is neutralized by an acid to thereby separate the pure polymer.

* * * * *